United States Patent
Chu et al.

(10) Patent No.: US 12,210,503 B2
(45) Date of Patent: Jan. 28, 2025

(54) METHOD TO PERFORM HASH TABLE LOOKUP FOR KEYS WIDER THAN DATA PATH SIZE

(71) Applicant: Pensando Systems Inc., Milpitas, CA (US)

(72) Inventors: Kit Chiu Chu, Freemont, CA (US); Alex Seibulescu, San Mateo, CA (US)

(73) Assignee: Pensando Systems Inc., Milpitas, CA (US)

( * ) Notice: Subject to any disclaimer, the term of this patent is extended or adjusted under 35 U.S.C. 154(b) by 138 days.

(21) Appl. No.: 17/091,977

(22) Filed: Nov. 6, 2020

(65) Prior Publication Data

US 2022/0147502 A1    May 12, 2022

(51) Int. Cl.
*G06F 16/22*    (2019.01)
*G06F 13/20*    (2006.01)
*G06F 13/42*    (2006.01)
*G06F 16/23*    (2019.01)

(52) U.S. Cl.
CPC .......... *G06F 16/2255* (2019.01); *G06F 13/20* (2013.01); *G06F 13/4221* (2013.01); *G06F 16/2379* (2019.01); *G06F 2213/0024* (2013.01); *G06F 2213/0026* (2013.01)

(58) Field of Classification Search
None
See application file for complete search history.

(56) References Cited

U.S. PATENT DOCUMENTS

| 6,731,643 | B1 | 5/2004 | Cucchi et al. |
| 7,043,494 | B1 | 5/2006 | Joshi et al. |
| 7,526,487 | B1 * | 4/2009 | Bobbitt ................. G06Q 10/10 |
| 8,849,825 | B1 * | 9/2014 | McHugh ............. G06F 16/1873 |
| | | | 707/737 |

(Continued)

FOREIGN PATENT DOCUMENTS

| WO | WO-2019164827 A1 | 8/2019 |
| WO | WO-2021222224 A1 | 11/2021 |

OTHER PUBLICATIONS

Yisheng Lv; Traffic Flow Prediction With Big Data: A Deep Learning Approach; IEEE:;pp. 865-873 (Year: 2015).*

(Continued)

*Primary Examiner* — Albert M Phillips, III
*Assistant Examiner* — Jermaine A Mincey
(74) *Attorney, Agent, or Firm* — Patterson + Sheridan, LLP

(57) ABSTRACT

Described are input output (IO) device configured to perform operations for performing a table lookup with a single wide key larger than a width of a system bus. These operations comprise: receiving the lookup key; performing a plurality of extraction cycles to determine a plurality of key fragments; calculating a final hash value for the lookup key by sequentially calculating, via a hash chain, an interim hash value for each of the key fragments; determine a read access address for a table entry of a logic table based on the final hash value for the lookup key; determine a plurality of read requests based on the read access address; determine a hit on the table entry with the lookup key by issuing each of the read requests to the memory subsystem; and provide the hit on the table entry to the requesting entity or a next processing entity.

31 Claims, 4 Drawing Sheets

(56) References Cited

U.S. PATENT DOCUMENTS

| | | | |
|---|---|---|---|
| 8,935,796 B2* | 1/2015 | Sloo | G06F 21/10 |
| | | | 726/26 |
| 8,996,535 B1 | 3/2015 | Kimmel et al. | |
| 9,384,145 B2 | 7/2016 | Gura et al. | |
| 10,725,958 B1* | 7/2020 | Ringe | G06F 13/4059 |
| 2003/0009474 A1 | 1/2003 | Hyland et al. | |
| 2004/0267732 A1 | 12/2004 | Luk et al. | |
| 2005/0083937 A1 | 4/2005 | Lim | |
| 2005/0174272 A1 | 8/2005 | Cadambi et al. | |
| 2008/0148341 A1 | 6/2008 | Ferguson et al. | |
| 2010/0199344 A1 | 8/2010 | Ling et al. | |
| 2011/0145260 A1 | 6/2011 | Ichino | |
| 2011/0219010 A1* | 9/2011 | Lim | G06F 16/00 |
| | | | 707/E17.014 |
| 2014/0079297 A1 | 3/2014 | Tadayon et al. | |
| 2014/0201113 A1 | 7/2014 | Harz et al. | |
| 2014/0337472 A1 | 11/2014 | Newton et al. | |
| 2015/0287192 A1 | 10/2015 | Sasaki | |
| 2016/0261408 A1* | 9/2016 | Peddada | H04L 9/0894 |
| 2018/0090202 A1* | 3/2018 | Kaminaga | G11C 16/0483 |
| 2018/0213067 A1 | 7/2018 | Yeh et al. | |
| 2019/0236752 A1* | 8/2019 | Das | G06T 1/60 |
| 2021/0152643 A1* | 5/2021 | Mathur | G06F 9/54 |
| 2022/0091989 A1* | 3/2022 | Chen | G06F 12/0868 |

OTHER PUBLICATIONS

Co-pending U.S. Appl. No. 16/860,650, inventors Pudiyapura; Ajeer Salil et al., filed Apr. 28, 2020.

Co-pending U.S. Appl. No. 17/000,172, inventors Pudiyapura; Ajeer Salil et al., filed Aug. 21, 2020.

U.S. Appl. No. 16/860,650 Office Action dated Sep. 15, 2021.

PCT/US2021/029368 International Search Report and Written Opinion dated Jul. 28, 2021.

Gupta: Algorithms for Routing Lookups and Packet Classification. Stanford University, Department of Computer Science, Doctoral Dissertation. Retrieved from the Internet: http://yuba.stanford.edu/~nickm/papers/pankaj-thesis.pdf [1-223] (2000).

Lim et al.: An Efficient IP Address Lookup Algorithm Using a Priority Trie. In IEEE Globecom [retrieved on Oct. 20, 2021]. Retrieved from the Internet: https://www.researchgate.net/profile/Hyesook-Lim/publication/224695840_NXG06-1_An_Efficient_IP_Address_Lookup Algorithrri_Using_a_Priority_Trie/links/02e7e5317d5bbalece000000/NXG06-1-An-Efficient-IP-Address-Lookup-Algorithm-Using-a-Priority-Trie.pdf [1-5](2006).

PCT/US2021/046970 International Search Report and Written Opinion dated Nov. 30, 2021.

Waldvogel et al.: Scalable High-Speed Prefix Matching. ACM Transactions on Computer Systems 19(4):440-482 Retrieved from the Internet: https://kops.uni-konstanz.de/bitstream/handle/123456789/6031/waldvogel01scalable.pdf?isAllowed=y&sequenc e=1 (2001).

* cited by examiner

METHOD TO PERFORM HASH TABLE LOOKUP FOR KEYS WIDER THAN DATA PATH SIZE

BACKGROUND

Network traffic refers to the amount of data moving across a network at a given point of time. Network data is mostly encapsulated in network packets, which provide the load in the network. Network traffic is the main component for network traffic measurement, network traffic control, and simulation. The proper organization of network traffic helps in ensuring the quality of service in a given network.

SUMMARY

In networking applications, generally, fixed-hardware implementations of hash tables are used for performance as compared to software implementations. However, these fixed-hardware implementations do not allow for changes to key compositions, key sizes, memory locations, or table sizes, after the device has been manufactured. To support networking application which require programmability, hardware designers developed programmable solution while maintaining the hardware performance advantage. A typical programmable solution includes configurable logic for key construction, hash calculation, memory lookup, and key comparison logic, but the actual maximum key size is still fixed because the size of, for example, key construction logic, hash calculation logic, key comparison logic, and memory access bus width, are all fixed in hardware. In some embodiments, to remove this limitation, the described programmable system with wide key support removes the fixed maximum key size restriction by iterating over the fixed width structure of an implemented hash table, combining the hash calculation of key fragments, issuing multiple memory accesses, and merging partial key fragment comparison results. As such, the described system, implements a programmable, wide key hash table without the limitations of the fixed width hardware structure.

The described programmable system with wide key support enables implementation of programmable, wide key hash tables with arbitrary large key width even when the underlying physical data path logic sizes are fixed. For a domain specific programmable input output (IO) device (such as a smartNIC), the described system provides much more flexibility when implementing applications as compared to a fixed hardware implementation or a programmable implementation without wide-key support. In some embodiments, the described programmable system with wide key support decomposes wide key hash table lookups into multiple operations of key fragments, carries out these individual operations independently, and composes each of the results of the individual operations as single hash table operation.

Accordingly, in one aspect, disclosed herein are programmable IO devices. These programmable IO devices each comprise a memory unit, a communication system, and a memory subsystem coupled to the memory unit via the communication system. These programmable IO devices are each configured to perform at least: receiving a transaction input from a requesting entity, the transaction input comprising a lookup key; performing a plurality of extraction cycles to determine a plurality of key fragments of the lookup key, wherein a size for the key fragments is determined according to a bandwidth of the communication system; serially providing each of the key fragments to a hash calculation module; calculating, via the hash calculation module, a final hash value for the lookup key by sequentially calculating, via a hash chain, an interim hash value for each of the key fragments, wherein each of the interim hash values is stored to a temporary register and used as an initial value in the next calculation, and wherein the first interim hash value is calculated for the first key fragment using zero as the initial value; determining a read access address for a table entry of a logic table based on the final hash value for the lookup key, a based address of the logic table, and a size of the logic table, wherein the table entry is populated with the lookup key; determining a plurality of read requests based on the read access address; determining a hit on the table entry with the lookup key by issuing each of the read requests to the memory subsystem and comparing a plurality of respective read responses, received from the memory subsystem, to the respective fragment; and providing the hit on the table entry to the requesting entity or a next processing entity. In some embodiments, each of the read requests include an incrementing address. In some embodiments, a size of each of the read requests is determined according to the bandwidth of the communication system. In some embodiments, each of the read requests is issued per each of the key fragments. In some embodiments, the each of the read responses comprise a data line in the memory unit. In some embodiments, each of the key fragments are matched with the corresponding data line to determine the hit on the table entry. In some embodiments, the read responses are received from the memory subsystem in a first in, first out (FIFO) order. In some embodiments, the read responses are reordered to a FIFO order before determining the hit on the table entry. In some embodiments, the hit on the table entry is determined by: maintaining, as comparisons for the matching are performed, a match indication on the lookup key via an AND of the matched data lines and the key fragments. In some embodiments, the hit on the table entry is determined by: applying a configurable mask to the last key fragment and the last data line returned before the matching is performed. In some embodiments, the requesting entity comprises a processing unit, hardware logics that use the logic table, or a stage in a hardware processing pipeline. In some embodiments, the next processing entity comprises a processing unit, hardware logics that use the logic table, or a stage in a hardware processing pipeline. In some embodiments, the transaction input comprises data structures that include fields. In some embodiments, the extraction cycles are performed to extract the fields to form the lookup key and determine the key fragments. In some embodiments, a portion of the fields are not used by the logic table. In some embodiments, the portion of the fields is provided to the next processing entity for downstream processing. In some embodiments, a start of transaction (SOT) control signal and an end of transaction (EOT) control signal, determined according to the transaction input, are stored on a sideband. In some embodiments, the communication system comprises a system bus. In some embodiments, the bandwidth of the communication system comprise a width of the system bus. In some embodiments, the hash calculation module employs a cyclic redundancy check (CRC) as a hash function. In some embodiments, the CRC is serialized to support wide keys with a single temporary storage. In some embodiments, the single temporary storage is a same width as output of the CRC. In some embodiments, the hash calculation module employs a configurable mask to the last fragment before determining the interim hash value for the last key fragment. In some embodiments, the interim hash value for the last key fragment comprises the final hash value for the transaction input. In some embodiments, the number of key fragments is configurable per the logic table. In some embodiments, the number of key fragments and the number of read requests are equal. In some embodiments, the size of each of the key fragments and a size of each of the read requests are determined according to the bandwidth of the communication system. In some embodiments, the number of read requests is determined according to the table entry and the bandwidth of the communication system. In some embodiments, each table entry in the logic table comprises a full key matching the lookup key and data associated with the full key. In some embodiments, the programmable IO device comprises a router, a switch, or a smart network interface card (smartNIC).

In a related yet separate aspect, disclosed herein are methods for performing a table lookup with a single wide key larger than a width of a system bus. The methods comprising: receiving a transaction input from a requesting entity, the transaction input comprising a lookup key; performing a plurality of extraction cycles to determine a plurality of key fragments of the lookup key, wherein a size for the key fragments is determined according to the width of the system bus; serially providing each of the key fragments to a hash calculation module; calculating, via the hash calculation module, a final hash value for the lookup key by sequentially calculating, via a hash chain, an interim hash value for each of the key fragments, wherein each of the interim hash values is stored to a temporary register and used as an initial value in the next calculation, and wherein the first interim hash value is calculated for the first key fragment using zero as the initial value; determining a read access address for a table entry of a logic table based on the final hash value for the lookup key, a based address of the logic table, and a size of the logic table, wherein the table entry is populated with the lookup key; determining a plurality of read requests based on the read access address; determining a hit on the table entry with the lookup key by issuing each of the read requests to a memory subsystem and comparing a plurality of respective read responses, received from the memory subsystem, to the respective fragment; and providing the hit on the table entry to the requesting entity or a next processing entity. In some embodiments, each of the read requests include an incrementing address. In some embodiments, a size of each of the read requests is determined according to the width of the system bus. In some embodiments, each of the read requests is issued per each of the key fragments. In some embodiments, the each of the read responses comprise a data line in the memory unit. In some embodiments, each of the key fragments are matched with the corresponding data line to determine the hit on the table entry. In some embodiments, the read responses are received from the memory subsystem in a FIFO order. In some embodiments, the read responses are reordered to a FIFO order before determining the hit on the table entry. In some embodiments, the hit on the table entry is determined by: maintaining, as comparisons for the matching are performed, a match indication on the lookup key via an AND of the matched data lines and the key fragments. In some embodiments, the hit on the table entry is determined by: applying a configurable mask to the last key fragment and the last data line returned before the matching is performed. In some embodiments, the requesting entity comprises a processing unit, hardware logics that use the logic table, or a stage in a hardware processing pipeline. In some embodiments, the next processing entity comprises a processing unit, hardware logics that use the logic table, or a stage in a hardware processing pipeline. In some embodiments, the transaction input comprises data structures that include fields. In some embodiments, the extraction cycles are performed to extract the fields to form the lookup key and determine the key fragments. In some embodiments, a portion of the fields are not used by the logic table. In some embodiments, the portion of the fields is provided to the next processing entity for downstream processing. In some embodiments, a start of transaction SOT control signal and an EOT control signal, determined according to the transaction input, are stored on a sideband. In some embodiments, the hash calculation module employs a CRC as a hash function. In some embodiments, the CRC is serialized to support wide keys with a single temporary storage. In some embodiments, the single temporary storage is a same width as output of the CRC. In some embodiments, the hash calculation module employs a configurable mask to the last fragment before determining the interim hash value for the last key fragment. In some embodiments, the interim hash value for the last key fragment comprises the final hash value for the transaction input. In some embodiments, the number of key fragments is configurable per the logic table. In some embodiments, the number of key fragments and the number of read requests are equal. In some embodiments, the size of each of the key fragments and a size of each of the read requests are determined according to the width of the system bus. In some embodiments, the number of read requests is determined according to the table entry and the width of the system. In some embodiments, each table entry in the logic table comprises a full key matching the lookup key and data associated with the full key. In some embodiments, methods are executed by a programmable IO device. In some embodiments, the programmable IO device comprises a router, a switch, or a smartNIC.

In a related yet separate aspect, disclosed herein are programmable systems with wide key support comprising: a requesting entity; and a programmable IO device comprising a memory unit, a system bus, and a memory subsystem coupled to the memory unit via the system bus, the programmable IO device coupled to the requesting entity and perform operations comprising: receiving a transaction input from a requesting entity, the transaction input comprising a lookup key; performing a plurality of extraction cycles to determine a plurality of key fragments of the lookup key, wherein a size for the key fragments is determined according to a width of the system bus; serially providing each of the key fragments to a hash calculation module; calculating, via the hash calculation module, a final hash value for the lookup key by sequentially calculating, via a hash chain, an interim hash value for each of the key fragments, wherein each of the interim hash values is stored to a temporary register and used as an initial value in the next calculation, and wherein the first interim hash value is calculated for the first key fragment using zero as the initial value; determining a read access address for a table entry of a logic table based on the final hash value for the lookup key, a based address of the logic table, and a size of the logic table, wherein the table entry is populated with the lookup key; determining a plurality of read requests based on the read access address; determining a hit on the table entry with the lookup key by issuing each of the read requests to the memory subsystem and comparing a plurality of respective read responses, received from the memory subsystem, to the respective fragment; and providing the hit on the table entry to the requesting entity or a next processing entity. In some embodiments, each of the read requests include an incrementing address. In some embodiments, a size of each of the read requests is determined according to the width of the system bus. In some embodiments, each of the read requests is issued per each of the key fragments. In some embodiments, the each of the read responses comprise a data line in the memory unit. In some embodiments, each of the key fragments are matched with the corresponding data line to determine the hit on the table entry. In some embodiments, the read responses are received from the memory subsystem in a FIFO order. In some embodiments, the read responses are reordered to a FIFO order before determining the hit on the table entry. In some embodiments, the hit on the table entry is determined by: maintaining, as comparisons for the matching are performed, a match indication on the lookup key via an AND of the matched data lines and the key fragments. In some embodiments, the hit on the table entry is determined by: applying a configurable mask to the last key fragment and the last data line returned before the matching is performed. In some embodiments, the requesting entity comprises a processing unit, hardware logics that use the logic table, or a stage in a hardware processing pipeline. In some embodiments, the next processing entity comprises a processing unit, hardware logics that use the logic table, or a stage in a hardware processing pipeline. In some embodiments, the transaction input comprises data structures that include fields. In some embodiments, the extraction cycles are performed to extract the fields to form the lookup key and determine the key fragments. In some embodiments, a portion of the fields are not used by the logic table. In some embodiments, the portion of the fields is provided to the next processing entity for downstream processing. In some embodiments, a start of transaction SOT control signal and an EOT control signal, determined according to the transaction input, are stored on a sideband. In some embodiments, the hash calculation module employs a CRC as a hash function. In some embodiments, the CRC is serialized to support wide keys with a single temporary storage. In some embodiments, the single temporary storage is a same width as output of the CRC. In some embodiments, the hash calculation module employs a configurable mask to the last fragment before determining the interim hash value for the last key fragment. In some embodiments, the interim hash value for the last key fragment comprises the final hash value for the transaction input. In some embodiments, the number of key fragments is configurable per the logic table. In some embodiments, the number of key fragments and the number of read requests are equal. In some embodiments, the size of each of the key fragments and a size of each of the read requests are determined according to the width of the system bus. In some embodiments, the number of read requests is determined according to the table entry and the width of the system. In some embodiments, each table entry in the logic table comprises a full key matching the lookup key and data associated with the full key. In some embodiments, the programmable IO device comprises a router, a switch, or a smartNIC.

In some embodiments, each table entry in the Advantages of the described programmable system with wide key support include: a hardware enhancement for increased flexibility and data throughput. Aspects of the described system are described herein within the context of an IO device (e.g., a smartNIC) processing network traffic; however, the system can be employed in other contexts such as associative arrays (e.g., networking switch/router forwarding tables, key-value databases systems, content cache systems, and so forth).

It shall be understood that different aspects of the described programmable system with wide key support can be appreciated individually, collectively, or in combination with each other. Various aspects of the systems described herein may be applied to any of the particular applications set forth below or for any other types of the data processing system disclosed herein. Any description herein concerning the data processing may apply to and be used for any other data processing situations. Additionally, any embodiments disclosed in the context of the data processing system or apparatuses are also applicable to the methods disclosed herein.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
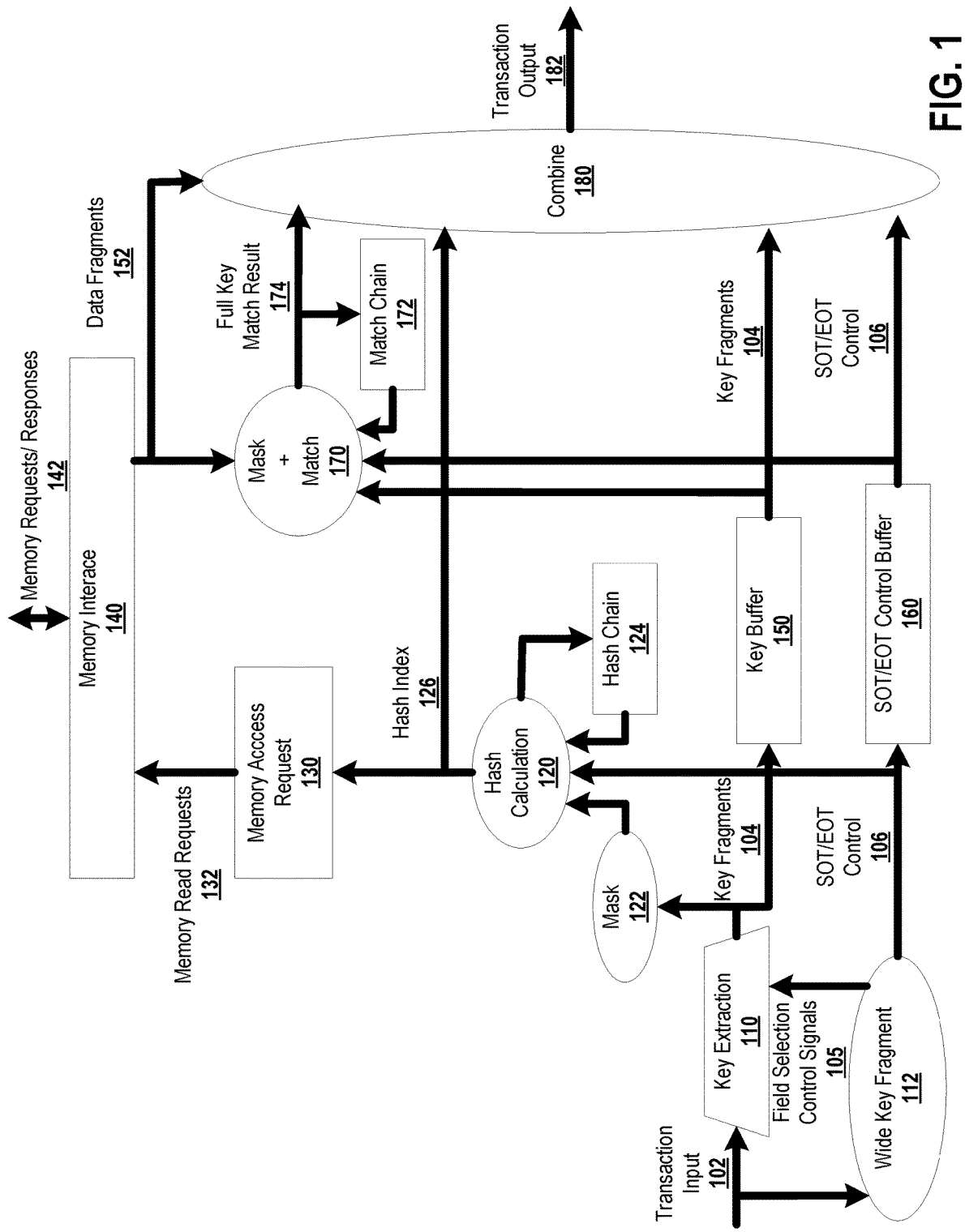
FIG. 1 depicts a non-limiting exemplary logic flow implemented via the described programmable system with wide key support to support a wide key hash table with the key wider than the data path width.

Described herein, in certain embodiments, are programmable IO devices. These programmable IO devices each comprise a memory unit, a communication system, and a memory subsystem coupled to the memory unit via the communication system. These programmable IO devices are each configured to perform at least: receiving a transaction input from a requesting entity, the transaction input comprising a lookup key; performing a plurality of extraction cycles to determine a plurality of key fragments of the lookup key, wherein a size for the key fragments is determined according to a bandwidth of the communication system; serially providing each of the key fragments to a hash calculation module; calculating, via the hash calculation module, a final hash value for the lookup key by sequentially calculating, via a hash chain, an interim hash value for each of the key fragments, wherein each of the interim hash values is stored to a temporary register and used as an initial value in the next calculation, and wherein the first interim hash value is calculated for the first key fragment using zero as the initial value; determining a read access address for a table entry of a logic table based on the final hash value for the lookup key, a based address of the logic table, and a size of the logic table, wherein the table entry is populated with the lookup key; determining a plurality of read requests based on the read access address; determining a hit on the table entry with the lookup key by issuing each of the read requests to the memory subsystem and comparing a plurality of respective read responses, received from the memory subsystem, to the respective fragment; and providing the hit on the table entry to the requesting entity or a next processing entity.

Also described herein, in certain embodiments, are methods for performing a table lookup with a single wide key larger than a width of a system bus. The methods comprising: receiving a transaction input from a requesting entity, the transaction input comprising a lookup key; performing a plurality of extraction cycles to determine a plurality of key fragments of the lookup key, wherein a size for the key fragments is determined according to the width of the system bus; serially providing each of the key fragments to a hash calculation module; calculating, via the hash calculation module, a final hash value for the lookup key by sequentially calculating, via a hash chain, an interim hash value for each of the key fragments, wherein each of the interim hash values is stored to a temporary register and used as an initial value in the next calculation, and wherein the first interim hash value is calculated for the first key fragment using zero as the initial value; determining a read access address for a table entry of a logic table based on the final hash value for the lookup key, a based address of the logic table, and a size of the logic table, wherein the table entry is populated with the lookup key; determining a plurality of read requests based on the read access address; determining a hit on the table entry with the lookup key by issuing each of the read requests to a memory subsystem and comparing a plurality of respective read responses, received from the memory subsystem, to the respective fragment; and providing the hit on the table entry to the requesting entity or a next processing entity.

Also described herein, in certain embodiments, are programmable systems with wide key support comprising: a requesting entity; and a programmable IO device comprising a memory unit, a system bus, and a memory subsystem coupled to the memory unit via the system bus, the programmable IO device coupled to the requesting entity and perform operations comprising: receiving a transaction input from a requesting entity, the transaction input comprising a lookup key; performing a plurality of extraction cycles to determine a plurality of key fragments of the lookup key, wherein a size for the key fragments is determined according to a width of the system bus; serially providing each of the key fragments to a hash calculation module; calculating, via the hash calculation module, a final hash value for the lookup key by sequentially calculating, via a hash chain, an interim hash value for each of the key fragments, wherein each of the interim hash values is stored to a temporary register and used as an initial value in the next calculation, and wherein the first interim hash value is calculated for the first key fragment using zero as the initial value; determining a read access address for a table entry of a logic table based on the final hash value for the lookup key, a based address of the logic table, and a size of the logic table, wherein the table entry is populated with the lookup key; determining a plurality of read requests based on the read access address; determining a hit on the table entry with the lookup key by issuing each of the read requests to the memory subsystem and comparing a plurality of respective read responses, received from the memory subsystem, to the respective fragment; and providing the hit on the table entry to the requesting entity or a next processing entity.

Certain Definitions

Unless otherwise defined, all technical terms used herein have the same meaning as commonly understood by one of ordinary skill in the art to which this described system belongs.

As used herein, the singular forms "a," "an," and "the" include plural references unless the context clearly dictates otherwise. Any reference to "or" herein is intended to encompass "and/or" unless otherwise stated.

Reference throughout this specification to "some embodiments," or "an embodiment," means that a particular feature, structure, or characteristic described in connection with the embodiment is included in at least one embodiment. Thus, the appearances of the phrase "in some embodiments," or "in an embodiment," in various places throughout this specification are not necessarily all referring to the same embodiment. Furthermore, the particular features, structures, or characteristics may be combined in any suitable manner in one or more embodiments.

As referenced herein, terms "component," "system," "interface," "unit," "block," "device" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers. Further, these components can execute from various computer readable media having various data structures stored thereon.

Moreover, the word "exemplary" where used herein to means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

As used herein, a wide key includes a number of bits larger than a particular hardware communication system, such as a system bus, a memory bus, or a hash calculation logic input bus. A wide key can be broken into key fragments that can then be employed to lookup data associated with the wide key (e.g., in a hash table) in memory.

As used herein, a wide key hash table includes a hash table stored to memory that employs a wide key.

As used herein, PCIe includes a high-speed serial computer expansion bus standard. In some examples, PCIe is a motherboard interface for hardware components, such as, graphics cards, hard drives, solid-state drives (SSDs), Wi-Fi and Ethernet hardware connections. PCIe is based on point-to-point topology, with separate serial links connecting every device to the root complex (host). PCIe has improvements over the older standards (e.g., Peripheral Component Interconnect (PCI), PCI eXtended (PCI-X) and Accelerated Graphics Port (AGP) bus standards), including higher maximum system bus throughput, lower input output (I/O) pin count and smaller physical footprint, better performance scaling for bus devices, a more detailed error detection and reporting mechanism (e.g., Advanced Error Reporting, (AER)), and native hot-swap functionality. More recent revisions of the PCIe standard provide hardware support for I/O virtualization.

As used herein, a flow represents unidirectional communication between a sender (or initiator) and a receiver (or responder). In some embodiments, a flow includes a sequence of packets that belong to a specific transaction or communication between two workloads. Packets can be associated with a flow using included layer 2-7 information, such as IP addresses (e.g., source IP address and destination IP address), L4 protocol, port numbers, and other application identifiers. Typically, a flow is a part of a session (e.g., a session can include an initiator flow and responder flow.

IO Devices

Computer systems employ a wide variety of peripheral components or IO devices (e.g., a smartNIC). For example, a host processor of a computer system can be connected to IO devices through a component bus defined by PCIe, which is a high-speed serial computer expansion bus standard. Device drivers (also referred to drivers) are hardware-specific software which controls the operation of hardware devices connected to computing systems.

In computing, virtualization techniques are used to allow multiple operating systems to simultaneously share processor resources. One such virtualization technique is Single Root I/O Virtualization (SR-IOV), which is described in the PCI-SIG Single Root I/O Virtualization and Sharing Specifications. A physical IO device may allow multiple virtual machines to use the device concurrently through SR-IOV. In SR-IOV, a physical device may have physical functions (PFs) that allow for input/output operations and device configuration, as well as one or more virtual functions (VFs) that allow for data input/output. According to SR-IOV, a PCIe device can appear to be multiple separate physical PCIe devices. For example, a SR-IOV NIC having a single port can have up to 256 virtual functions, with each virtual function representing a respective NIC port.

Smart Network Interface Card

A smartNIC (also known as an intelligent server adapter (ISA)) goes beyond simple connectivity and implements network traffic processing on the NIC that would necessarily be performed by the CPU in the case of a foundational NIC. SmartNICs can be employed in cloud data center servers to boost performance by offloading operations of the CPUs of the servers by performing network datapath processing through an IO subsystem. For example, the IO subsystem provided through a SmartNIC offloads low-level operations from server CPUs to dramatically increase network and application performance. By installing smartNICs, communications service providers can deliver significantly better revenue-earning services with a small increase in investment.

With the increase in the complexity of networks and the protocols which run on them, the amount of processing that hosts must perform for networking operations has increased exponentially. This problem is amplified because, as the requirement for more network bandwidth grows, so does the need for precious host CPU time. As such, smartNICs are increasingly deployed in datacenters to offload these complex networking tasks away from the host CPU. This allows more CPU available to the applications on the host. Smart-NICs include a capacity to a large amount of state data that can be used to provide advanced services, such as virtual workload implementations. SmartNICs are usually presented to the host as a PCIe device but can also be involved in offloading host CPU tasks as a bump-in-the-wire ethernet device. The advanced functions can be host agnostic as a host usually uses off the rack drivers to communicate with these devices. SmartNICs can be managed separately from the hosts by administrators who are not necessarily the same as the host administrators.

In some embodiments, smartNICs perform enhanced Layer3-Layer7 monitoring and policy applications. In some embodiments, these applications maintain an active network state for data flows to/from a workload. This network state may include protocol state, policy information, admission state, and so forth. In some embodiments, when workloads are migrated, the active network state of the workload must also be migrated to the destination entity (e.g., a destination smartNIC).

FIG. 1 depicts a logic flow 100 implemented via the described programmable system with wide key support to support a wide key hash table with a key width that is wider than the data path width. The depicted logic flow shows receiving a transaction input (e.g., a hash lookup) 102 from, for example, a processing unit (not shown), extracting 110 key fragments 104 from the transaction input 102, performing hash calculation 120 over the extracted key fragments 104 to generate a hash value, creating memory read requests on a memory interface 140 based on the hash value, receiving read response data fragments from the memory interface 140, comparing data fragments with key fragments 104 to determine if they match 170, combining fragment match results 180 to form a full key match result, and sending a transaction output 182 with the full key match result and its associated data to, for example, the next processing unit (not shown).

In some embodiments, transaction inputs 102 include data structures that contain the fields used to form a lookup key for a hash table (even though these fields could be scattered in different locations inside this data structure). In some embodiments, transaction inputs 102 contain pass through fields that are relevant to downstream processing units and not used by this particular hash table. For smartNIC application, for example, these fields may include packet headers of multiple layers of tunnel encapsulations, but for a key-value database application, these fields may include the full key that is associated with a particular database lookup.

In some embodiments, transaction outputs 182 include data structures that contains hash table lookup results (e.g., a hash table entry), which may include table match indication, table hit location, and the respective lookup result. In some embodiments, transaction outputs 182 contain pass through fields that are relevant to downstream processing units and not used by this particular hash table. For the smartNIC application, associated data may include packet forwarding, packet editing, packet policing, packet accounting instructions, and so forth. For a key-value database, for example, the associated data is user defined and typically has no specific meaning to the database system.

The depicted logic flow 100 includes wide key fragment module 112; key extraction module 110; hash calculation module 120; memory access request module 130; the memory interface 140; key buffer 150; a sideband (SOT/EOT Control) buffer 160; mask plus match module 170; and combine module 180. In some embodiments, the wide key fragment module 112 recognizes boundaries within the provided input transaction 102. For example, an input transaction 102 may comprise a single clock cycle transfer of all the data, or the input transaction 102 may divide data into multiple clock cycles and provide SOT/EOT as a part of the input. In some embodiments, the wide key fragment module 112 recognizes such boundaries and generates an internal SOT/EOT (the SOT/EOT controls 106) based on the requirements of for the hash table lookup.

In some embodiments, the wide key fragment module 112 drives the selection control of the key fragments 104 from the input transaction 102 by the key extraction module 110 via the field selection controls 105. In some embodiments, the field selection controls 105 include information regarding which fields in the input transaction 102 the key extraction module 100 should use to form the lookup key (e.g., the key fragments). In some embodiments, the field selection controls 105 are static configuration per the respective hash-table. In some embodiments, when the wide key fragment module 112 drives fragment control configuration for the first key fragment, it set SOT to 1 and when it drives the fragment control for the last key fragment, it sets EOT to 1.

In some embodiments, the wide key fragment module 112 provides the SOT/EOT control signals 106 to the sideband SOT/EOT control buffer 160. In some embodiments, the sideband SOT/EOT control 160 is buffer used to store the SOT/EOT control signals 106 for key fragment in order to maintain a transaction boundary. In some embodiments, a transaction boundary indicates the boundary between key fragments in the transaction input 102. In some embodiments, the combine module 180 uses these two control signals (106) to present a single transaction output 182 from multiple fragment results.

In some embodiments, the key extraction module 110 extracts fields from the transaction input 102 (based on the field selection control signals 104 provided by the wide key fragment module 112) to form the key fragments 104 of a full search key for hash table lookup. In some embodiments, the hash calculation module 120 performs hash calculation (e.g., CRC) with the input key fragments 104 and an initial value from the hash chain module 124.

In some embodiments, the memory access request module 130 generates a sequence of memory read requests 132 based on the hash value of the full key (the "hash index" 126), hash table key size, and hash table base address. In some embodiments, the memory interface 140 tracks memory read request 142 order, reorders memory responses 142 received from a memory subsystem (not shown) and provides a response according to an order of the request. In some embodiments, the mask plus match module 170 matches key fragments 104 with table data provided by the memory interface 140 and applies a mask to both last key fragment and last data response to support key sizes that are not a multiple of the key fragment width to determine whether there is a match in the hash table for the hash index 126 (the "full key match result" 174).

In some embodiments, the key buffer 150 stores the key fragments 104 until a read response is provided by the memory interface 140. In some embodiments, the combine module 180 combines the associated data fragments 152, the hash index 126, and pass through data (e.g., any data field from the input transaction 102, such as the key fragments 104 or SOT/EOT control signals 106, that is passed on to, for example, a next processing unit) to form the outgoing transaction 182, which is provided to, for example, the next processing unit.

In some embodiments, the key extraction module 110 performs multiple key extraction cycles for a transaction input 102. For example, a single wide key may be provided as the transaction input 102. In such an example, the key extraction module 110 divides the single wide key 102 into multiple wide key fragments 104 based on, for example, a bus width for the extraction logic. The key fragments 104 are serially provided to the hash calculation module 120. For example, the individual key fragments 104 arriving from the previous stage are fed into a single CRC hash calculation module 120 serially. In some embodiments, the SOT/EOT control signals 106 are stored in the SOT/EOT Control Buffer 160.

In some embodiments, the hash calculation module 120 employs CRC as a hash function; however, other hash functions, such as checksum or murmur, may be employed as the hash function. The CRC hash function is used because it is area efficient and has a uniform distribution. Moreover, CRC can be serialized to support wide keys with a single temporary storage. In some embodiments, the single temporary storage is the same width as the CRC output.

In some embodiments, for a first key fragment, the hash calculation module 120 employs zero as the initial value for the CRC calculation, computes the CRC for the first key fragment, and stores it into the temporary register. In some embodiments, for all subsequent key fragments 104, the hash calculation module 120 employs the hash chain 124 where the data stored to the temporary register is used as the initial value and the CRC hash continues computation with the current key fragment. To support key sizes that are not a multiple of the data bus width and allow for table associated data, the hash calculation module 120 may apply a configurable mask 122 to the last key fragment before the last key fragment is fed into the hash computation logic.

In some embodiments, once the hash calculation module 120 reaches the last key fragment, the CRC output is the final hash value of the single wide key 102. This final hash value is provided to the memory access request module 130. In the memory access stage (see FIG. 2) the memory access request module 130 employs the received final hash value to calculate memory addresses. In some embodiments, after each key fragment has been used for CRC computation, the fragment is stored in the key buffer 150 to be used in the mask and match module 170.

In some embodiments, once the hash calculation module 120 determines the final hash value of the single wide key 102, the memory address of the table entry is calculated by the memory access request module 130 based on the base address of the hash table (e.g., base_address+(entry_size* (hash_value % hash table size)). In some embodiments, to support key width larger than the memory interface 140 data bus width, multiple read requests 132 are provided by the memory access request module 130 for a single hash value, with incrementing addresses for each request. In some embodiments, the key fragment width is the same as the memory data bus width and a single memory read request is issued per key fragment. In some embodiments, the number of read requests is determined by dividing a table entry, which comprises a full key and data associated with the full key, by the memory bus width.

As read responses come back from the memory subsystem via the memory interface 140, key-fragments are matched with the corresponding data lines from memory. The results are combined in the mask plus match module 170 to determine whether there is a wide-key hash table entry hit. When the memory system maintains read request/read response order, the order can be determined by matching memory response with key fragments 104 in a FIFO order. However, when the memory subsystem does not guarantee read response order, reordering logic can be employed by the memory interface 140 e such that the key comparison can be performed in FIFO order.

In some embodiments, the mask plus match module 170 performs a full key match via the match chain 172 which includes an AND of all key fragment matches. In some embodiments, the mask plus match module 170 initializes a full key match to true at start of a transaction and then compares each key fragment by fragment. In some embodiments, if any of the key fragments 104 does not match the then full key match result 174 is set to false. As such, the mask plus match module 170 maintains a full key match indication (e.g., the match chain 172), ANDing it with the result of each key fragment as the comparisons are performed. Similar to the hash calculation side, a configurable mask (not shown) is applied on the last key fragment 152 and the last data line returned before the match is performed.

In some embodiments, the size and number of the key fragments 104 and memory read requests/responses are not identical (e.g., if one or both are not determined according to the bus width, but some other associated, configurable value set based on, for example, system requirements). In such examples, to map the read responses and key fragments when determining the full key match result 174, the mask plus match module 170 maintains a running pointer to keep track of a current key fragment number and offset. In such an example, when a read data with bus size N returns, the mask plus match module 170 compares N bits of key fragment from this pointer, and then move the pointer by N bits, or when memory bus is wider the key fragment size, the pointer is used to compare multiple key fragments with a single result.

In some embodiments, the combine module 180 uses the SOT/EOT control signals 106 to identify a transaction boundary; waits until the lookup results (based on the key fragments 104 and the associated data fragments 152 provided by the memory interface 140) are compared in the mask plus match module 170; and generates a single transaction output 182 that combines the hash table match results from mask plus match module 170, the hash value 126 generated from hash calculation module 120, and the last data fragment 152 returned from memory interface 140 (in the case where there is data associated with this hash entry). In some embodiments, the combine module 180 provides the transaction output 182 to a next processing unit.

Exemplary Process

Figure 2:
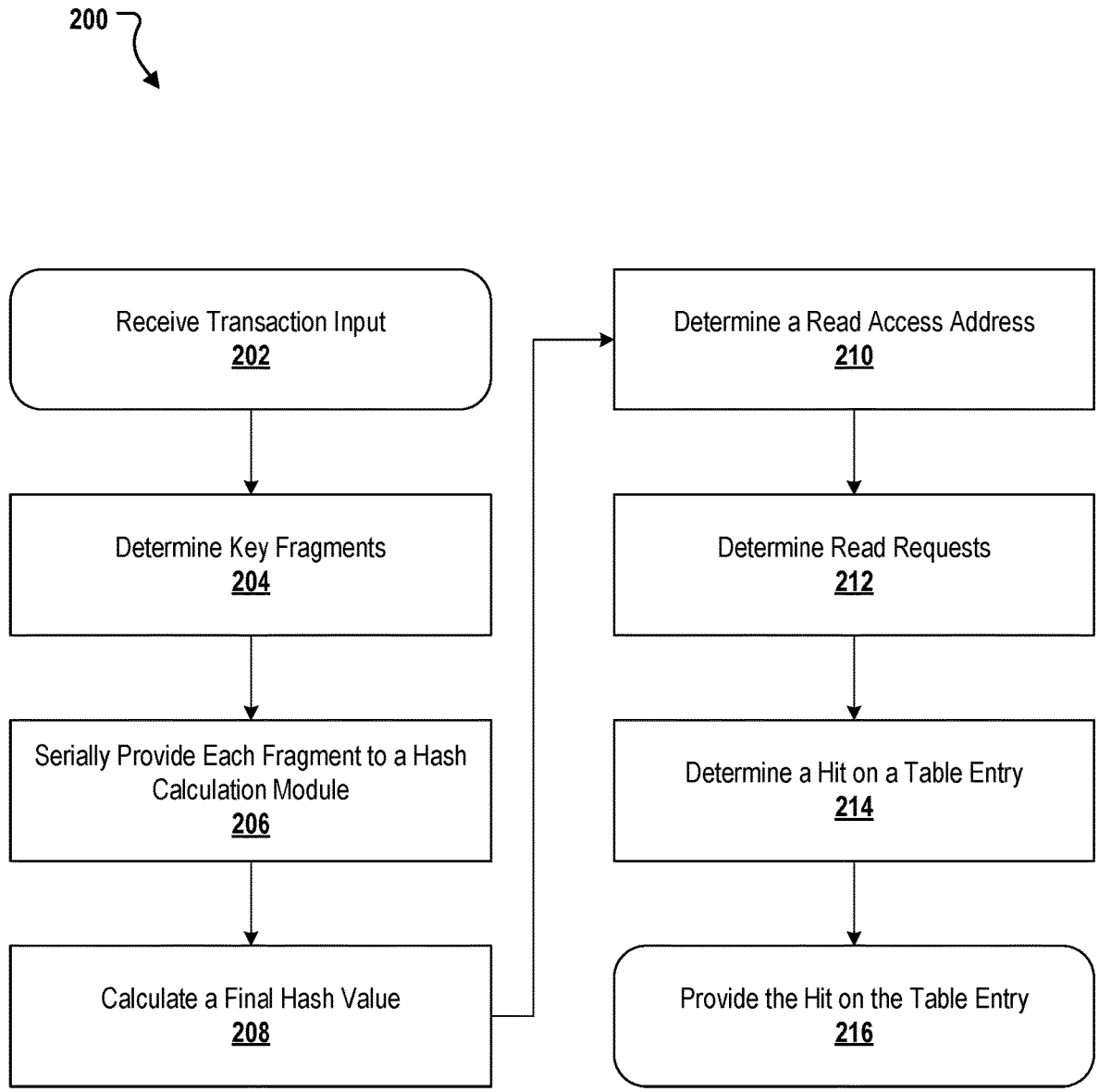
FIG. 2 depicts a flowchart of non-limiting exemplary process that can be implemented by embodiments of the present disclosure.

FIG. 2 depicts a flowchart of an example process 200. The example process 200 can be implemented by the various elements of the described programmable system with wide key support (e.g., by an IO device such as a smartNIC). As depicted, the example process shows in more detail a pipelined design implementation of a programmable hash table. For clarity of presentation, the description that follows generally describes the example process 200 in the context of FIGS. 1 and 3-5. However, it will be understood that the process 200 may be performed, for example, by any other suitable system, environment, software, and hardware, or a combination of systems, environments, software, and hardware as appropriate. In some embodiments, various operations of the process 200 can be run in parallel, in combination, in loops, or in any order. In some embodiments, the process 200 is executed by a programmable IO device. In some embodiments, the programmable IO device comprises a router, a switch, or a smartNIC. In some embodiments, the programmable IO device includes a memory unit, a communication system, and a memory subsystem coupled to the memory unit via the communication system. In some embodiments, the communication system comprises a system bus.

At step 202, a transaction input comprising a lookup key is received from a requesting entity. In some embodiments, the requesting entity comprises a processing unit, hardware logics that use the logic table, or a stage in a hardware processing pipeline. From 202, the process 200 proceeds to step 204.

At 204, a plurality of extraction cycles are performed to determine a plurality of key fragments of the lookup key. In some embodiments, a size for the key fragments is determined according to a bandwidth of the communication system. In some embodiments, the transaction input comprises data structures that include fields. In some embodiments, the extraction cycles are performed to extract the fields to form the lookup key and determine the key fragments. In some embodiments, a portion of the fields are not used by the logic table. In some embodiments, the portion of the fields is provided to the next processing entity for downstream processing. In some embodiments, an SOT control signal and an EOT control signal are determined according to the transaction input and stored on a sideband. In some embodiments, the communication system comprises a system bus. In some embodiments, the bandwidth of the communication system comprise a width of the system bus. In some embodiments, the number of key fragments is configurable per the logic table. From 204, the process 200 proceeds to step 206.

At 206, each of the fragments is serially provided to a hash calculation module. From 206, the process 200 proceeds to step 208.

At 208, a final hash value for the lookup key is calculated by the hash calculation module by sequentially calculating, via a hash chain, an interim hash value for each of the key fragments. In some embodiments, each of the interim hash values is stored to a temporary register and used as an initial value in the next calculation. In some embodiments, the first interim hash value is calculated for the first key fragment using zero as the initial value. In some embodiments, the hash calculation module employs a CRC as a hash function. In some embodiments, the CRC is serialized to support wide keys with a single temporary storage. In some embodiments, the single temporary storage is a same width as output of the CRC. In some embodiments, the hash calculation module employs a configurable mask to the last fragment before determining the interim hash value for the last key fragment. In some embodiments, the interim hash value for the last key fragment comprises the final hash value for the transaction input. From 208, the process 200 proceeds to step 210.

At 210, a read access address for a table entry of a logic table is determined based on the final hash value for the lookup key, a based address of the logic table, and a size of the logic table. In some embodiments, the table entry is populated with the lookup key. In some embodiments, each table entry in the logic table comprises a full key matching the lookup key and data associated with the full key. From 210, the process 200 proceed to step 212.

At 212, a plurality of read requests is determined based on the read access address. In some embodiments, the number of key fragments and the number of read requests are equal. In some embodiments, the size of each of the key fragments and a size of each of the read requests are determined according to the bandwidth of the communication system. In some embodiments, the number of read requests is determined according to the table entry and the bandwidth of the communication system. From 212, the process 200 proceed to step 214.

At 214, a hit on the table entry with the lookup key is determined by issuing each of the read requests to the memory subsystem and comparing a plurality of respective read responses, received from the memory subsystem, to the respective fragment. In some embodiments, each of the read requests include an incrementing address. In some embodiments, a size of each of the read requests is determined according to the bandwidth of the communication system. In some embodiments, each of the read requests is issued per each of the key fragments. In some embodiments, the each of the read responses comprise a data line in the memory unit. In some embodiments, each of the key fragments are matched with the corresponding data line to determine the hit on the table entry. In some embodiments, the read responses are received from the memory subsystem in a FIFO order. In some embodiments, the read responses are reordered to a FIFO order before determining the hit on the table entry. In some embodiments, the hit on the table entry is determined by: maintaining, as comparisons for the matching are performed, a match indication on the lookup key via an AND of the matched data lines and the key fragments. In some embodiments, the hit on the table entry is determined by: applying a configurable mask to the last key fragment and the last data line returned before the matching is performed. From 214, the process 200 proceed to step 216.

At 216, the hit on the table entry is provided to the requesting entity or a next processing entity. In some embodiments, the next processing entity comprises a processing unit, hardware logics that use the logic table, or a stage in a hardware processing pipeline. From 216, the process 200 ends.

Computing System Architecture

Figure 3:
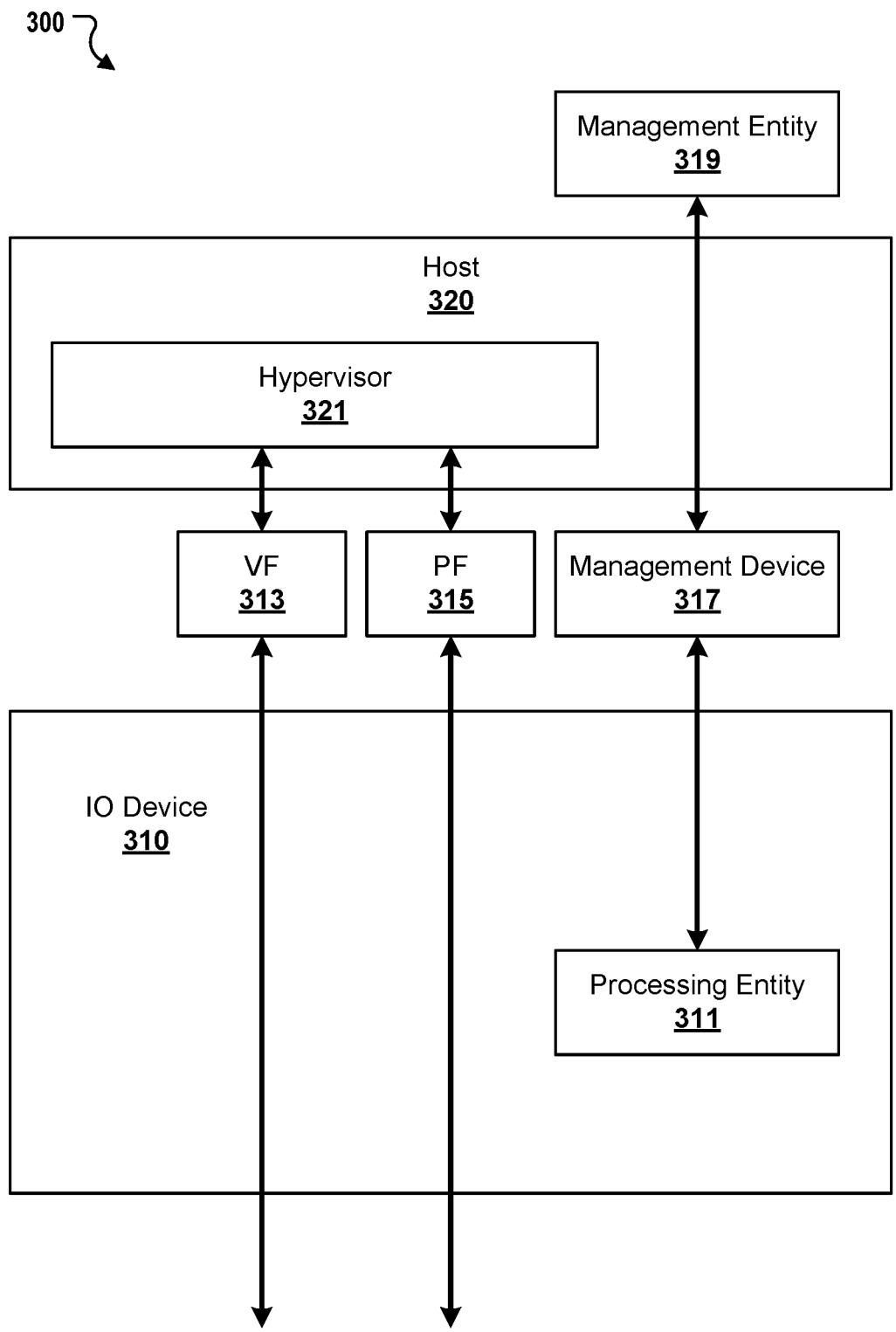
FIG. 3 depicts a non-limiting exemplary computing system architecture that may be employed by embodiments of the present disclosure.

FIG. 3 depicts a block diagram of an exemplary computing system architecture 300, in accordance with embodiments of the described programmable system with wide key support. A hypervisor 321 on the host computing system 320 may interact with the physical IO device 310 (e.g., a smartNIC) using the PFs 315 and one or more VFs 313. As illustrated, the computing system 320 may comprise a management device 317 configured for management of the interface devices. The management device 317 may be in communication with a processing entity 311 (e.g., an ARM processor) and a management entity 319 (e.g., management virtual machine system). It should be noted that the illustrated computing system is only an example mechanism, without suggesting any limitation as to the scope of the described system. The provided programmable IO interface and methods can be applied to any operating-system-level virtualization (e.g., container and docker system) or machine level virtualization or computing system without virtualization features.

The hypervisor 321 generally provides operating system functionality (e.g., process creation and control, file system process threads, etc.) as well as CPU scheduling and memory management for the host. In some cases, the host computing system 320 may include programs that implement a machine emulator and virtualizer. The machine emulator and virtualizer may assist in virtualizing respective computer IO devices in virtual machines, such as virtualized hard disks, compact disk drives, and NICs. Virtio is a virtualization standard for implementing virtual IO devices in a virtual machine and may be considered as an abstraction for a set of common emulated devices in a hypervisor.

In one aspect, a programmable device interface is provided via the IO device 310 (e.g., a smartNIC). The device interface may be a highly optimized ring based I/O queue interface with an efficient software programming model to deliver high performance with CPU and PCIe bus efficiency. The provided IO device interface mechanism allows for native hardware speeds when using the device emulator. The IO device interface allows the host system to interface with the edge device with existing device drivers without reconfiguration or modification. In some cases, the VF device, PF device and management device may have similar driver interface such that such devices can be supported by a single driver. Such devices may, in some cases, be referred to as Ethernet devices.

The IO device 310 may provide a variety of services and/or functionality to an operating system operating as a host on computing system 320. For example, the IO device may be configured as an edge device that provides network connectivity functions to the computing system, coprocessor functionality (e.g., graphics processing, encryption/decryption, database processing, etc.) and the like. The IO device 310 may interface with other components in the computing system 100 via, for example, a PCIe bus.

As mentioned above, SR-IOV specification enables a single root function (for example, a single Ethernet port) to appear to virtual machines as multiple physical devices. A physical IO device with SR-IOV capabilities may be configured to appear in the PCI configuration space as multiple functions. The SR-IOV specification supports physical functions and virtual functions.

Physical functions are full PCIe devices that may be discovered, managed, and configured as normal PCI devices. Physical functions configured and manage the SR-IOV functionality by assigning virtual functions. The IO device may expose one or more physical functions (PFs) 315 to a host computing system 320 or hypervisor 321. The PFs 315 may be full-featured PCIe devices that include all configuration resources and capabilities for the IO device. In some cases, the PFs may be PCIe functions that include SR-IOV extended capability, which facilitates the configuration or management of the IO device. The PF device is essentially a base controller of the Ethernet device. The PF device may be configured with up to 256 VFs. In some cases, the PFs may include extended operations such as allocating, configuring and freeing a VF, discovering hardware capabilities of the VF, such as Receive Side Scaling (RSS), discovering hardware resources of the VF, such as number of queues and interrupts resources, configuring the hardware resources and features of a VF, saving and restoring hardware state and the like. In some instances, the PF device may be configured as a boot device which may present an Option ROM base address registers (BAR).

The IO device may also provide one or more virtual functions (VFs) 313. The VFs may be lightweight PCIe functions that contain the resources necessary for data movement but may have a minimized set of configuration resources. In some cases, the VFs may include lightweight PCIe functions that support SR-IOV. To use SR-IOV devices in a virtualized system, the hardware may be configured to create multiple VFs. These VFs may be made available to the hypervisor for allocations to virtual machines. The VFs may be manipulated (e.g., created, configured, monitored, or destroyed) for example, by the SR-IOV physical function device. In some cases, each of the multiple VFs is configured with one or more BARs to map NIC resources to the host system. A VF may map one or more LIFs or port, which are used in the IO device for forwarding and transaction identification. A LIF may belong to only one VF. Within a physical device, all virtual functions may have an identical BAR resource layout, stacked sequentially in host PCIe address space. The IO device PCIe interface logic may be programmed to map control registers and NIC memory regions with programmable access permissions (e.g., read, write, execute) to the VF BARs.

The IO device 310 may comprise a management device 317 for management of the IO device. The management device 317 may not have direct access to the network uplink ports. The management device may be in communication with the processing entity 311. For example, the traffic on the management device may be steered to internal receive queues for processing by the management software on the processing entity 311. In some cases, the management device may be made available to pass through the hypervisor to a management entity 319 such as a management virtual machine. For example, the management device 317 may be assigned a device ID different from the PF device 315, such that a device driver in the hypervisor may be released for the PF device when the PF device does not claim the management device.

Computer Systems

Figure 4:
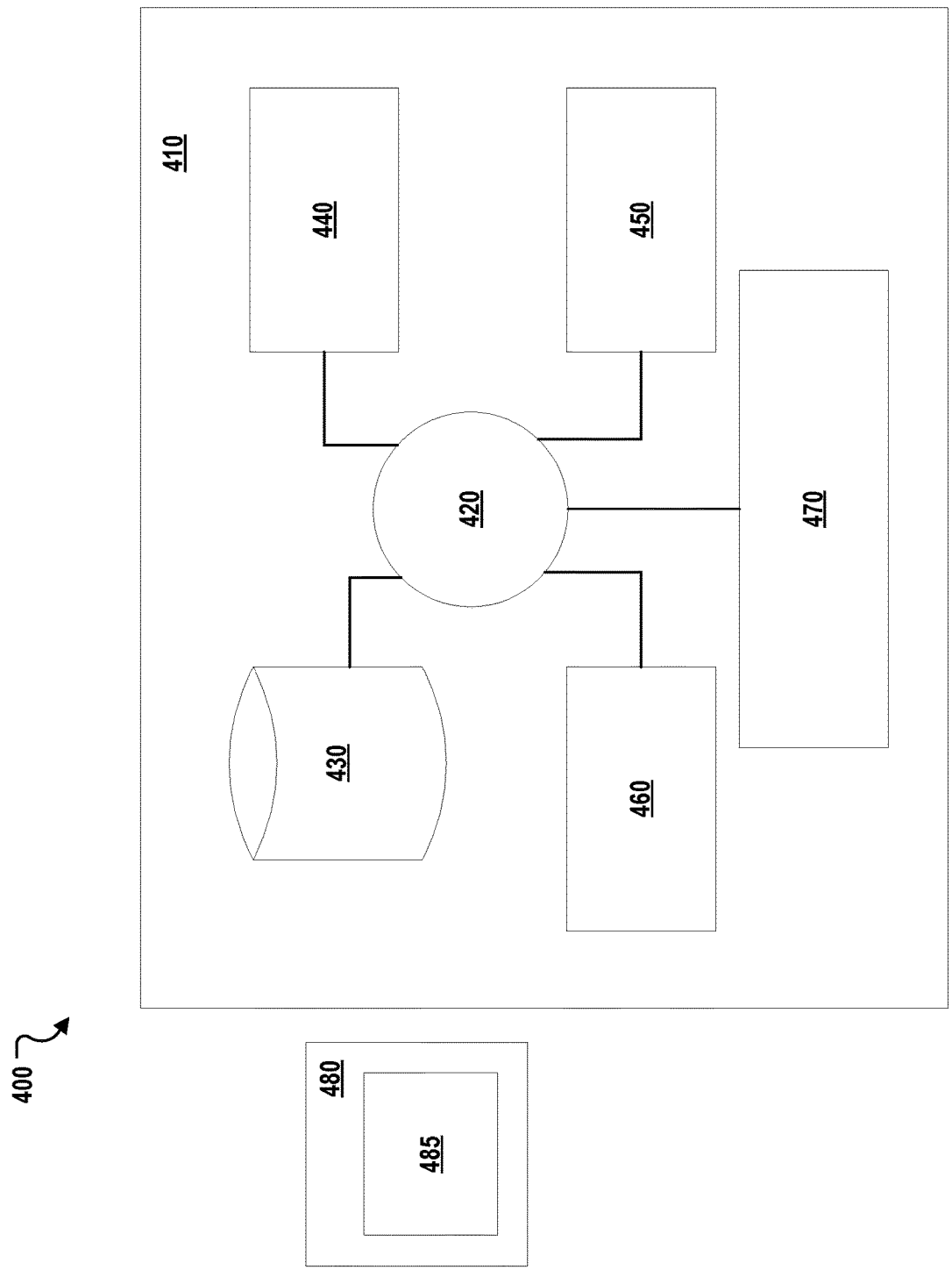
FIG. 4 depicts a non-limiting example computer system that can be programmed or otherwise configured to implement methods or systems of the present disclosure.

Computer systems are provided herein that can be used to implement methods or systems of the disclosure. FIG. 4 depicts an example a computer system 400 that can be programmed or otherwise configured via the various components to implement methods or systems of the present disclosure. For example, the IO subsystem 470 can be programmed to provide or received a workload state for a migrating workload. As depicted, the computer system 400 includes a computing device 410 and an optional electronic display 480. In some embodiments, the computing device 410 is substantially similar to the computing system 320 depicted in FIG. 3.

In the depicted embodiment, the computing device 410 includes a CPU (also "processor" and "computer processor" herein) 420, which is optionally a single core, a multi core processor, or a plurality of processors for parallel processing. The computing device 410 also includes memory or memory location 430 (e.g., random-access memory, read-only memory, flash memory); electronic storage unit 440 (e.g., hard disk); communication interface 450 (e.g., network adapter) for communicating with one or more other systems; peripheral devices 460 (e.g., cache, other memory, data storage or electronic display adapters), and IO subsystem 470 (e.g., edge device, such as a smartNIC). The memory 430, the electronic storage unit 440, the communication interface 450, the peripheral devices 460, and the IO subsystem 470 are in communication with the CPU 420 through a communication bus (solid lines), such as a motherboard.

In some embodiments, the CPU 420 can execute a sequence of machine-readable instructions, which can be embodied in a program or software. The instructions may be stored in a memory location, such as the memory 430. The instructions can be directed to the CPU 420, which can subsequently program or otherwise configure the CPU 420 to implement methods of the present disclosure. Examples of operations performed by the CPU 420 can include fetch, decode, execute, and write back. In some embodiments, the CPU 420 is part of a circuit, such as an integrated circuit. One or more other components of the computing device 410 can be optionally included in the circuit. In some embodiments, the circuit is an ASIC or a Field Programmable Gate Array (FPGA).

In some embodiments, the IO subsystem 470 (e.g., the above described edge device) comprises an expansion card, such as a smartNIC, that is connected with the CPU 420 via PCIe. In some embodiments, the IO subsystem 470 is completely programmable ASIC engine programed to provide implementations of the systems and methods described herein.

In some embodiments, the electronic storage unit 440 includes a data storage unit (or data repository) for storing data. In some embodiments, the electronic storage unit 440 stores files, such as drivers, libraries, images, and saved programs. In some embodiments, the electronic storage unit 440 stores user data, e.g., user preferences and user programs. In some embodiments, the computing device 410 includes one or more additional data storage units that are external, such as located on a remote server that is in communication through an intranet or the internet.

The computing device 410 is optionally operatively coupled to a network with the aid of the communication interface 450. A network may include a local area network (LAN), wide area network (WAN), the Internet, or a combination thereof, and connects computing devices. In some embodiments, the computing device 410 communicates with one or more remote computer systems through the network. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants. In some embodiments, a user can access the computing device 410 via a network.

In some embodiments, methods as described herein are implemented by way of machine (e.g., computer processor) executable code stored on an electronic storage location of the computing device 410, such as, for example, on the memory 430 or the electronic storage unit 440. In some embodiments, the CPU 420 is adapted to execute the code. In some embodiments, the machine executable or machine-readable code is provided in the form of software. In some embodiments, during use, the code is executed by the CPU 420. In some embodiments, the code is retrieved from the electronic storage unit 440 and stored on the memory 430 for ready access by the CPU 420. In some situations, the electronic storage unit 440 is precluded, and machine-executable instructions are stored on the memory 440. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 410 can include or be in communication with the electronic display 480. In some embodiments, the electronic display 480 provides a user interface (UI) 485.

Processing Devices and Processors

In some embodiments, the platforms, systems, media, and methods described herein include a computer, or use of the same. In further embodiments, the computer includes one or more hardware CPUs or general purpose graphics processing units (GPGPUs) that carry out the device's functions by providing chains of operation to an IO subsystem provided through a SmartNIC connected to the CPU or GPGPU via PCIe. In still further embodiments, the computer comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, handheld computers, Internet appliances, mobile smartphones, tablet computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the computer is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, compact disc (CD)-Read only Memories (ROMs), Digital Versatile Disks (DVDs), flash memory devices, magnetic disk drives, magnetic tapes drives, optical disk drives, and cloud computing-based storage. In further embodiments, the storage and/or memory device is a combination of devices such as those disclosed herein.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. In some embodiments, a computer program includes a sequence of instructions, executable in the computer's CPU or in the processors of an IO subsystem, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

While preferred embodiments of the present subject matter have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments of the subject matter described herein may be employed in practicing the described system.

What is claimed is:

1. A network interface card (NIC) comprising a memory unit, a communication system, and a memory subsystem coupled to the memory unit via the communication system, the NIC configured to perform at least:
   receiving a transaction input from a requesting entity, the transaction input comprising a lookup key, wherein the lookup key includes data for processing within a hash table to determine a read access address for a table entry of a logic table stored in the memory unit;
   identifying, by processing the transaction input, a plurality of fields within a data structure based on a field selection control, wherein the plurality of fields are scattered in non-contiguous locations within the data structure, and wherein the field selection control is based upon a static configuration of the hash table that identifies the plurality of fields within the data structure;
   creating a plurality of key fragments from the plurality of fields by performing a plurality of extraction cycles, wherein a size of each of the key fragments is based on a width of a bus of the communication system coupled to a hash calculation circuit;
   serially transmitting each of the key fragments to the hash calculation circuit using the bus;
   calculating, via the hash calculation circuit, a final hash value for the lookup key by sequentially calculating, via a hash chain, an interim hash value for each of the key fragments using the hash table; and
   identifying the read access address for the table entry of the logic table based on the final hash value for the lookup key.

2. The NIC of claim 1, wherein the NIC configured to perform at least:
- determining a plurality of read requests based on the read access address;
- determining a hit on the table entry with the lookup key by issuing each of the read requests to the memory subsystem and comparing a plurality of respective read responses, received from the memory subsystem, to the respective fragment; and
- providing the hit on the table entry to the requesting entity or a next processing entity, wherein each of the read requests include an incrementing address.

3. The NIC of claim 2, wherein a size of each of the read requests is determined according to a bandwidth of the communication system.

4. The NIC of claim 3, wherein each of the read requests is issued per each of the key fragments.

5. The NIC of claim 4, wherein the each of the read responses comprise a data line in the memory unit, and wherein each of the key fragments are matched with the corresponding data line to determine the hit on the table entry.

6. The NIC of claim 5, wherein the read responses are received from the memory subsystem in a first in, first out (FIFO) order.

7. The NIC of claim 5, further configured to perform: reordering the read responses to a first in, first out (FIFO) order before determining the hit on the table entry.

8. The NIC of claim 5, wherein the hit on the table entry is determined by:
- maintaining, as comparisons for the matching are performed, a match indication on the lookup key via an AND of the matched data lines and the key fragments.

9. The NIC of claim 5, wherein the hit on the table entry is determined by:
- applying a configurable mask to the last key fragment and the last data line returned before the matching is performed.

10. The NIC of claim 1, wherein the requesting entity comprises a processing unit, hardware logics that use the logic table, or a stage in a hardware processing pipeline.

11. The NIC of claim 2, wherein the next processing entity comprises a processing unit, hardware logics that use the logic table, or a stage in a hardware processing pipeline.

12. The NIC of claim 1, wherein the data structure further comprises a second plurality of fields are not used by the logic table, and wherein the second plurality of fields are provided to a next processing entity for downstream processing.

13. The NIC of claim 1, wherein a start of transaction (SOT) control signal and an end of transaction (EOT) control signal, determined according to the transaction input, are stored on a sideband.

14. The NIC of claim 1, wherein the communication system comprises a system bus, and wherein a bandwidth of the communication system comprise a width of the system bus.

15. The NIC of claim 1, wherein the hash calculation circuit employs a cyclic redundancy check (CRC) as a hash function.

16. The NIC of claim 15, wherein the CRC is serialized to support wide keys with a single temporary storage, and wherein the single temporary storage is a same width as output of the CRC.

17. The NIC of claim 1, wherein the hash calculation circuit employs a configurable mask to the last fragment before determining the interim hash value for the last key fragment.

18. The NIC of claim 1, wherein the interim hash value for the last key fragment comprises the final hash value for the transaction input.

19. The NIC of claim 1, wherein a number of key fragments is configurable per the logic table.

20. The NIC of claim 1, wherein a number of key fragments and a number of read requests are equal, and wherein the size of each of the key fragments and a size of each of the read requests are determined according to a bandwidth of the communication system.

21. The NIC of claim 1, wherein a number of read requests is determined according to the table entry and a bandwidth of the communication system.

22. The NIC of claim 1, wherein each table entry in the logic table comprises a full key matching the lookup key and data associated with the full key.

23. The NIC of claim 1, wherein the NIC comprises a router, a switch, or a smart network interface card (smart-NIC).

24. A method for a network interface card (NIC) performing a table lookup with a single wide key larger than a width of a system bus, the method comprising:
- receiving a transaction input from a requesting entity, the transaction input comprising a lookup key, wherein the lookup key includes data for processing within a hash table to determine a read access address for a table entry of a logic table stored in a memory unit;
- identifying, by processing the transaction input, a plurality of fields within a data structure based on a field selection control, wherein the plurality of fields are scattered in non-contiguous locations within the data structure, and wherein the field selection control is based upon a static configuration of the hash table that identifies the plurality of fields within the data structure;
- creating a plurality of key fragments from the plurality of fields by performing a plurality of extraction cycle, wherein a size of each of the key fragments is based on the width of the system bus wherein the system bus is coupled to a hash calculation circuit;
- serially transmitting each of the key fragments to the hash calculation circuit using the system bus;
- calculating, via the hash calculation circuit, a final hash value for the lookup key by sequentially calculating, via a hash chain, an interim hash value for each of the key fragments using the hash table;
- determining the read access address for the table entry of the logic table based on the final hash value for the lookup key;
- identifying a plurality of read requests based on the read access address;
- identifying a hit on the table entry with the lookup key by issuing each of the read requests to a memory subsystem and comparing a plurality of respective read responses, received from the memory subsystem, to the respective fragment; and
- transmitting the hit on the table entry to the requesting entity or a next processing entity.

25. The method of claim 24, wherein the each of the read responses comprise a data line in a memory unit, and wherein each of the key fragments are matched with the corresponding data line to determine the hit on the table entry, wherein the hit on the table entry is determined by:

maintaining, as comparisons for the matching are performed, a match indication on the lookup key via an AND of the matched data lines and the key fragments; and applying a configurable mask to the last key fragment and the last data line returned before the matching is performed.

26. The method of claim 24, wherein the hash calculation circuit employs a cyclic redundancy check (CRC) as a hash function.

27. The method of claim 24, wherein the hash calculation circuit employs a configurable mask to the last fragment before determining the interim hash value for the last key fragment.

28. The method of claim 24, wherein a number of key fragments and a number of read requests are equal, and wherein the size of each of the key fragments and a size of each of the read requests are determined according to the width of the system bus.

29. A programmable system with wide key support, comprising:
   a requesting entity; and
   a network interface card (NIC) comprising a memory unit, a system bus, and a memory subsystem coupled to the memory unit via the system bus, the NIC coupled to the requesting entity and configured to perform operations comprising:
      receiving a transaction input from the requesting entity, the transaction input comprising a lookup key, wherein the lookup key includes data for processing within a hash table to determine a read access address for a table entry of a logic table stored in the memory unit;
      identifying, by processing the transaction input, a plurality of fields within a data structure that in combination form the lookup key based on a field selection control, wherein the plurality of fields are scattered in non-contiguous locations within the data structure, and wherein the field selection control is based upon a static configuration of the hash table that identifies the plurality of fields within the data structure;
      creating a plurality of key fragments from the plurality of fields by performing a plurality of extraction cycles, wherein a size of each of the key fragments is based on a width of the system bus wherein the system bus is coupled to a hash calculation circuit;
      serially transmitting each of the key fragments to the hash calculation circuit using the system bus;
      calculating, via the hash calculation circuit, a final hash value for the lookup key by sequentially calculating, via a hash chain, an interim hash value for each of the key fragments using the hash table;
      identifying the read access address for the table entry of the logic table based on the final hash value for the lookup key;
      identifying a plurality of read requests based on the read access address;
      identifying a hit on the table entry with the lookup key by issuing each of the read requests to the memory subsystem and comparing a plurality of respective read responses, received from the memory subsystem, to the respective fragment; and
      transmitting the hit on the table entry to the requesting entity or a next processing entity.

30. The NIC of claim 1, wherein each of the interim hash values is stored to a temporary register and used as an initial value in a next calculation, and wherein a first interim hash value is calculated for a first key fragment using zero as the initial value.

31. The NIC of claim 1, wherein the read access address is further determined based on a base address of the logic table and a size of the logic table, and wherein the table entry is populated with the lookup key.

* * * * *